(12) United States Patent
Kohno et al.

(10) Patent No.: US 6,215,603 B1
(45) Date of Patent: Apr. 10, 2001

(54) LENS HOLDING STRUCTURE IN A LENS BLOCK FORMING ALL OR PART OF AN OPTICAL SYSTEM AND METHOD OF ASSEMBLING THE LENS BLOCK

(75) Inventors: Tetsuo Kohno, Toyonaka; Masashi Isono, Sakai; Tomoo Doi, Wakayama-Ken; Hiromu Mukai, Kawachinagano; Kazuhiko Ishimaru, Kaizuka, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/226,875

(22) Filed: Jan. 7, 1999

(30) Foreign Application Priority Data

Jan. 7, 1998 (JP) .................................................. 10-001211

(51) Int. Cl.[7] ...................................................... B02B 7/02
(52) U.S. Cl. .......................... 359/819; 359/704; 359/822
(58) Field of Search .................................. 359/819, 704, 359/703, 822

(56) References Cited

U.S. PATENT DOCUMENTS

| 4,727,457 | * | 2/1988 | Thillays ................................... 362/32 |
| 5,107,371 | * | 4/1992 | Shibata et al. ........................ 359/642 |
| 5,461,444 |   | 10/1995 | Okura et al. .......................... 354/286 |
| 5,699,200 |   | 12/1997 | Uno et al. ............................. 359/700 |

\* cited by examiner

*Primary Examiner*—Georgia Epps
*Assistant Examiner*—Tim Thompson
(74) *Attorney, Agent, or Firm*—Morrison & Foerster LLP

(57) ABSTRACT

A lens holding structure in a lens block forming all or part of an optical system, the lens holding structure capable of attaining a compact lens block of inexpensive and simple construction by using a holding barrel having an outer diameter smaller than an outer diameter of the largest lens element to be included in the lens block. The largest lens element is fixed to another lens element to be included in the lens block or the holding barrel by a face thereof having a predetermined angle with respect to an optical axis of the lens block.

20 Claims, 6 Drawing Sheets

LENS HOLDING STRUCTURE IN A LENS BLOCK FORMING ALL OR PART OF AN OPTICAL SYSTEM AND METHOD OF ASSEMBLING THE LENS BLOCK

CROSS-REFERENCE TO RELATED APPLICATIONS

This application is based on Application No. HEI 10-1211 filed in Japan filed on Jan. 7, 1998, the content of which is hereby incorporated by reference.

BACKGROUND OF THE INVENTION

1. Field of the Invention

The present invention relates to a lens holding structure, and more specifically relates to a lens holding structure in a lens block of an optical system used in optical devices such as a digital camera, video camera, lens shutter camera and the like.

2. Description of the Related Art

Recent years has seen a demand for compact digital still cameras, lens shutter cameras and the like, and particularly heightened demand for compactness in optical systems that occupy a relatively large space in such equipment. Size of an optical system in a direction of an optical axis thereof, i.e., a distance from a surface of a lens positioned on the outermost object side to the image plane is determined by the optical design specifications and the like. On the other hand, a size of the optical system in a direction perpendicular to the optical axis is normally determined by an outer diameter of a lens element forming a structural element of the optical system. The size of the optical system is determined based on a lens element of the largest outer diameter since each lens element is held by fixedly fitting the outer circumference of the lens element within a holding barrel. Accordingly, in a conventional optical system, the holding barrel cannot be made smaller than the lens element of the largest outer diameter even when there are markedly different outer diameters among the lens elements, thereby disadvantageously enlarging the optical system.

In order to eliminate this disadvantage, U.S. Pat. No. 5,699,200 proposes a lens holding structure that reduces the outer diameter of the holding barrel by providing a notch in the outer circumference of the lens element and securing the lens element by applying an adhesive to the notch. U.S. Pat. No. 5,461,444 proposes a lens holding structure wherein flat surface areas parallel to the optical axis are formed outside effective diameter of a lens element with the lens element fastened to the holding barrel via screws in the flat surface areas.

In the lens holding structure disclosed in U.S. Pat. No. 5,699,200, however, it is difficult to reduce the cost of the lens element due to the complex shape of the lens element provided with the notch, and the notch cannot always be formed depending on the shape of the lens element. Furthermore, in the lens holding structure disclosed in U.S. Pat. No. 5,461,444, sufficient compactness cannot be attained because holding areas formed on the holding barrel for the screw fastening in the flat surface areas have a larger diameter than the largest outer diameter of the lens element.

OBJECT AND SUMMARY

An object of the present invention is to provide an improved lens holding structure and lens block assembling method, capable of eliminating the previously described disadvantages.

Another object of the present invention is to provide a lens holding structure and a lens block assembling method capable of attaining a compact lens block of inexpensive and simple construction.

These objects are attained by providing a lens holding structure in a lens block forming all or part of an optical system, the lens holding structure comprising:
a first lens element;
a second lens element arranged adjacent to the first lens element with a predetermined open space on an optical axis of the lens block relative to the first lens element; and
a holding barrel having an outer diameter smaller than the maximum outer diameter of the first lens element;
wherein the second lens element is fixed to the holding barrel, and the first lens element is directly attached and fixed only to the second lens element.

In this lens holding structure, the first lens element may be fixed to the second lens element by adhesive. Furthermore, the first lens element may include a first face perpendicular to the optical axis and outside effective diameter thereof, and the second lens element may include a second face perpendicular to the optical axis and outside effective diameter thereof, and the first lens element may be fixed to the second lens element by adhering the first face to the second face using adhesive.

These objects are further attained by providing a lens holding structure in a lens block forming all or part of an optical system, the lens holding structure comprising:
a first lens element; and
a holding barrel having an outer diameter smaller than the maximum outer diameter of the first lens element;
wherein the first lens element is directly attached and fixed to the holding barrel only by a first face thereof perpendicular to an optical axis of the lens block.

In this lens holding structure, the first lens element may be fixed to the holding barrel by adhesive. The holding barrel may include a second face perpendicular to the optical axis, and the first lens element may be fixed to the holding barrel by adhering the first face to the second face using adhesive. Furthermore, the lens holding structure may be further provided with the second lens element arranged adjacent to the first lens element with a predetermined open space on the optical axis relative to the first lens element.

These objects are further attained by providing a lens holding structure in a lens block forming all or part of an optical system, the lens holding structure comprising:
a first lens element; and
a holding barrel having an outer diameter smaller than the maximum outer diameter of the first lens element;
wherein the first lens element is directly attached and fixed to the holding barrel by a first face thereof placed at an angle with respect to an optical axis of the lens block.

In this lens holding structure, the first lens element may be fixed to the holding barrel using adhesive. Furthermore, the holding barrel may include a second face corresponding to the first face of the first lens element, and the first lens element may be fixed to the holding barrel by adhering the first face to the second face using adhesive. The lens holding structure may be further provided with the second lens element arranged adjacent to the first lens element with a predetermined open space on the optical axis relative to the first lens element.

These objects are attained by providing a lens holding structure in a lens block forming all or part of an optical system, the lens holding structure comprising:
a first lens element; and
a holding barrel having an outer diameter smaller than the maximum outer diameter of the first lens element;

wherein the first lens element directly attached and fixed to the holding barrel by a first face outside effective diameter thereof, the first face forming an extension of effective surface of the first lens element.

In this lens holding structure, the first lens element may be fixed to the holding barrel using adhesive. The holding barrel may include a second face corresponding to the first face of the first lens element, and the first lens element may be fixed to the holding barrel by adhering the first face to the second face using adhesive. The lens holding structure may be further provided with the second lens element arranged adjacent to the first lens element with a predetermined open space on the optical axis relative to the first lens element.

These objects are further attained by providing a method for assembling the lens block which forms all or part of an optical system and includes a first lens element, a second lens element adjacent to the first lens element and a holding barrel having an outer diameter smaller than the maximum outer diameter of the first lens element, the method comprising the steps of:

fixing the second lens element to the holding barrel;

adhering the first lens element to the second lens element or the holding barrel using adhesive; and centering the first lens element before adhesion at the step of adhering is completely finished, so as to achieve alignment of the lens block.

At the step of adhering in this method of assembling the lens block, the first lens element may be adhered only to the second lens element. Alternatively, at the step of adhering, the first lens element may be adhered to the holding barrel using only a face thereof perpendicular with respect to an optical axis of the lens block. Alternatively, at the step of adhering, the first lens element may be adhered to the holding barrel by a face thereof placed at an angle with respect to the optical axis. Alternatively, at the step of adhering, the first lens element may be adhered to the holding barrel by a face outside effective diameter thereof, the face forming an extension of effective surface of the first lens element.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiments of the lens holding structure and lens block assembling method of the present invention are described hereinafter with reference to the accompanying drawings.

In a zoom lens system comprising adjacent lens units having different optical power such as a positive-negative or positive-negative-positive arrangement, the size of the outer lens diameter often differs markedly among the lens elements included in each lens unit. The lens holding structure and the lens block assembling method of the present invention are described hereinafter by way of examples of a positive-negative-positive zoom lens for a video camera, and a positive-negative zoom lens for a lens shutter camera. The lens block as the lens unit to be applied the present invention is not limited to comprise a part of an optical system as described below (i.e., to comprise the unit which moves integratedly when zooming and focusing). The present invention may be applied to the lens block comprising the entirety of an optical system.

Figure 1:
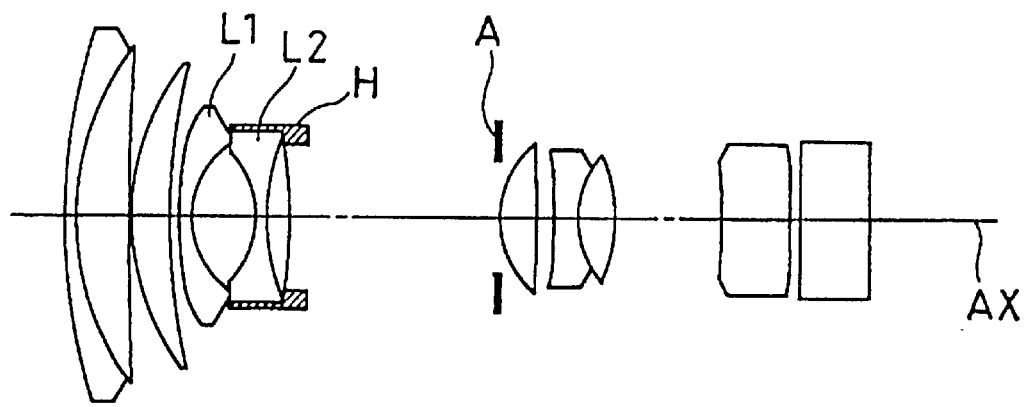
FIG. 1 is a lens structural diagram briefly showing a zoom lens of a first embodiment.
Figure 1:
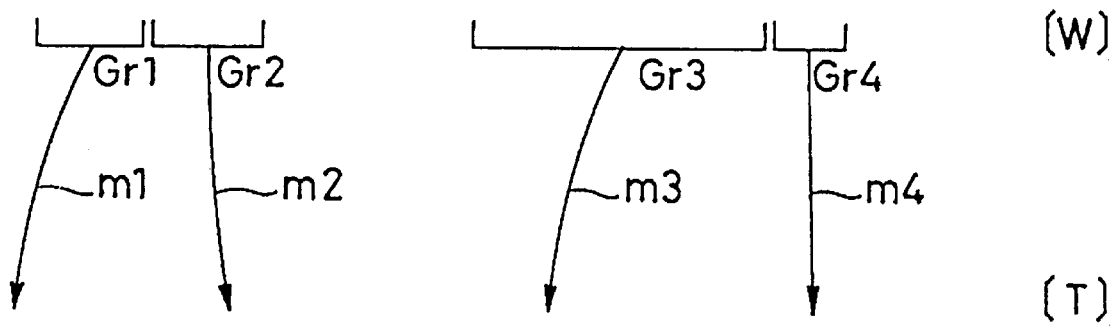
Figure 3:
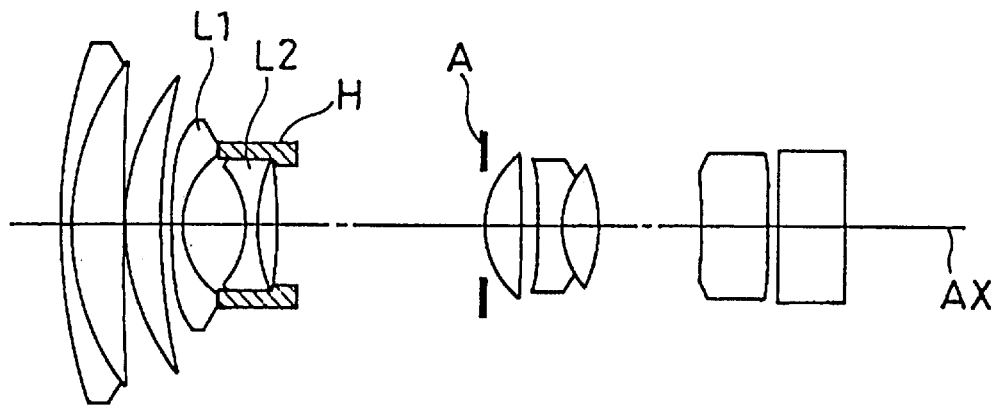
FIG. 3 is a lens structural diagram briefly showing the construction of a zoom lens of a second embodiment.
Figure 3:
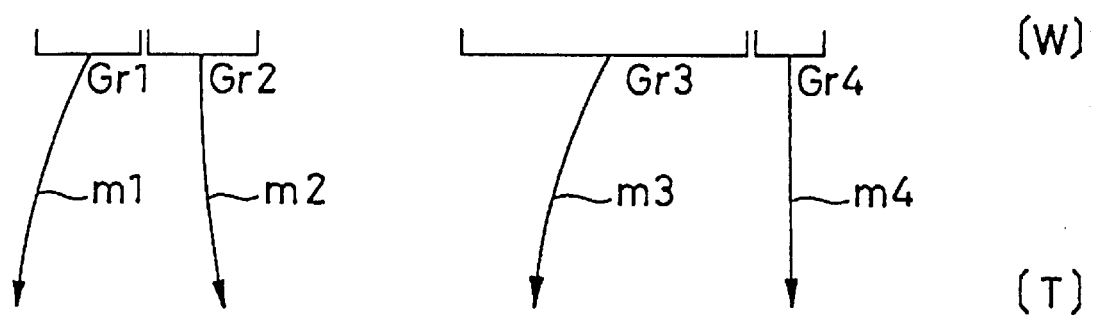

Application to a Second Lens Unit (negative optical power) in a Zoom Lens for a Video Camera FIGS. 1 and 3 respectively show the lens construction of a zoom lens of the first and second embodiments and the lens arrangement thereof at the wide angle end (W), wherein the present invention is applied to a second lens unit Gr2. Both zoom lenses are for positive lead video cameras and each zoom lens comprises, sequentially from the object side, a first lens unit Gr1 having positive optical power, a second lens unit Gr2 having negative optical power, a third lens unit Gr3 having positive optical power, and a fourth lens unit Gr4 forming a low-pass filter. Each lens unit Gr1 moves as indicated by arrows mi (i=1, 2, 3, 4) when zooming from the wide angle side (W) to the telephoto side (T).

As can be understood from the lens construction diagrams, in an optical system which projects an image on a photoreceptor surface of a solid state image sensing element such as a charge-coupled device (CCD) and the like, there is scant difference in the outer diameters of the lens elements in each lens unit positioned from the diaphragm A to the image side, although there is a great difference in the outer diameters of the lens elements in the lens unit positioned from the diaphragm A to the object side. In the first and second embodiments, the lens block of the second lens unit Gr2 disposed on the object side from the diaphragm A is the subject of the application of the present invention.

The first and second embodiments, in a lens block of the second lens unit Gr2 forming part of a zoom lens (FIGS. 1 and 3), are lens holding structures for holding a first lens element (negative meniscus lens) L1 disposed at one end of the lens block, and a second lens element (a cemented lens comprising a biconcave lens and biconvex lens) L2 disposed adjacent to the first lens element L1 so as to have a predetermined open space on the optical axis AX of the lens block relative to the first lens element L1, on a holding barrel H having an outer diameter that is smaller than the maximum outer diameter of the first lens element L1. The optical system can be made compactly and inexpensively, and the space around the periphery of the second lens element L2 of small outer diameter can be used by holding the first lens element L1 outside the holding barrel H without using the outer circumferential surface of the lens element L1 when holding the first lens element L1 of larger outer diameter.

Figure 2:
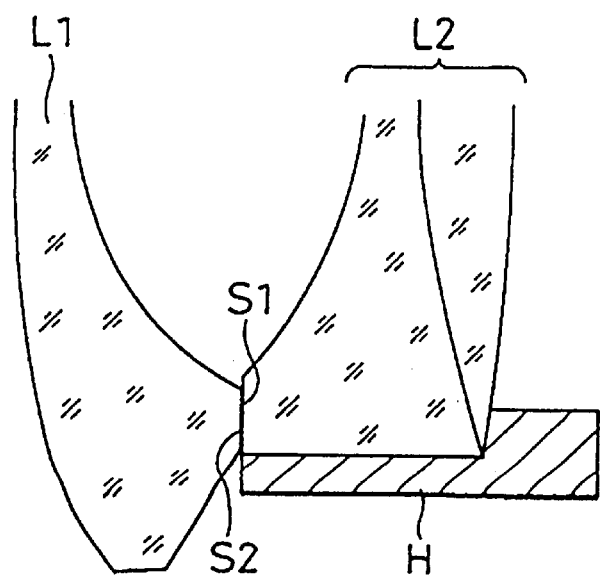
FIG. 2 is a section view showing an enlargement of the main part of the first embodiment.

First Embodiment (FIGS. 1 and 2)

FIG. 2 shows an enlargement of the main cross section structure of the first embodiment. As can be understood from FIG. 2, characteristics of the first embodiment are the second lens element L2 fixed to the holding barrel H, and the first lens element L1 fixed directly to the second lens element L2 only. Working faces S1 and S2 perpendicular relative to the optical axis AX are respectively formed on the first and second lens elements L1 and L2 outside the effective diameters, and the first lens element L1 and the second lens element L2 are directly attached and fixed by the working faces S1 and S2.

When assembling the lens block of the second lens unit Gr2, first, the second lens element L2 is engaged with the inner surface of the holding barrel H by its circumference and is fixed by adhesive to the holding barrel H. The second lens element L2 of the present embodiment is centered in advance so as to engage with the holding barrel H by its circumference. However, the second lens element L2 may be an uncentered lens. In this case, the second lens barrel L2 is centered after engaging with the holding barrel H, and then it is fixed using adhesive.

Then, the first lens element L1 and the second lens element L2 are directly attached and fixed by adhesive on the working faces S1 and S2. The first lens element L1 is centered before anchoring by adhesive is completed, so that alignment of the lens block is attained. The first lens element L1 may be an uncentered lens since it is centered while assembling. The working face S1 may be attached and fixed by adhesive to the endface of the holding barrel H as well as the working face S2. The working faces S1 and S2 may not be perpendicular relative to the optical axis AX and may have a predetermined inclination so that the first lens element L1 is approximately centered only by adhering the working faces S1 and S2 each other.

Figure 4:
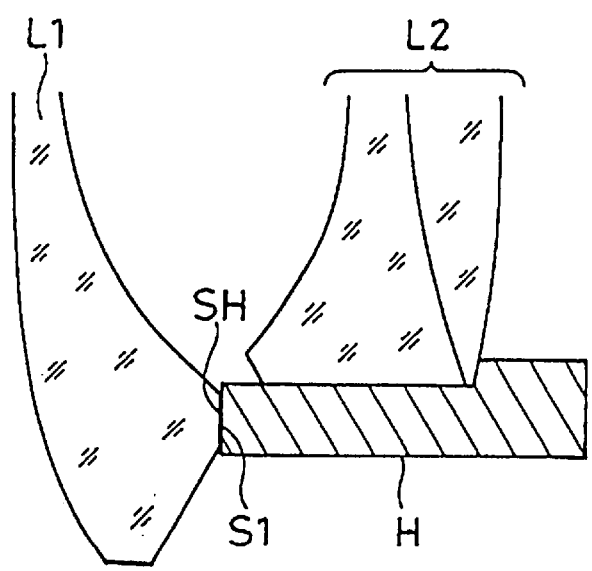
FIG. 4 is a section view showing an enlargement of the main part of the second embodiment.

Second Embodiment (FIGS. 3 and 4)

FIG. 4 shows an enlargement of the main cross section structure of the second embodiment. As can be understood from FIG. 4, characteristics of the second embodiment are the second lens element L2 fixed to the holding barrel H, and the first lens element L1 fixed directly to the holding barrel H on only a working face S1, which is perpendicular relative to the optical axis AX. Working faces S1 and SH perpendicular relative to the optical axis AX are respectively formed on the holding barrel H and the first lens element L1 outside the effective diameter, and the first lens element L1 is directly fixed to the holding barrel H by the working faces S1 and SH.

When assembling the lens block of the second lens unit Gr2, first, the second lens element L2 is engaged with the inner surface of the holding barrel H by its circumference and is fixed by adhesive to the holding barrel H. The second lens element L2 of the present embodiment is centered in advance so as to engage with the holding barrel H by its circumference. However, the second lens element L2 may be an uncentered lens. In this case, the second lens barrel L2 is centered after engaging with the holding barrel H, and then it is fixed using adhesive.

Then, the first lens element L1 and the holding barrel H are directly attached and fixed by adhesive on the working faces SI and SH. The first lens element L1 is centered before anchoring by adhesive is completed, so that alignment of the lens block is attained. The first lens element L1 may be an uncentered lens since it is centered while assembling. The working face S1 may be attached and fixed by adhesive on the second lens element L2 outside effective diameter as well as the working face SH. The working faces S1 and SH may not be perpendicular relative to the optical axis AX and may have a predetermined inclination so that the first lens element L1 is approximately centered only by adhering the working faces S1 and SH each other.

A compact lens block having an inexpensive and simple construction can be realized by the aforesaid method of assembling the lens block and lens holding structure of the first and second embodiments. In this way, an optical system in a zoom lens and the like including this lens block, when used in a video camera such as a digital camera, allows a compact and inexpensive video camera to be achieved.

Figure 5:
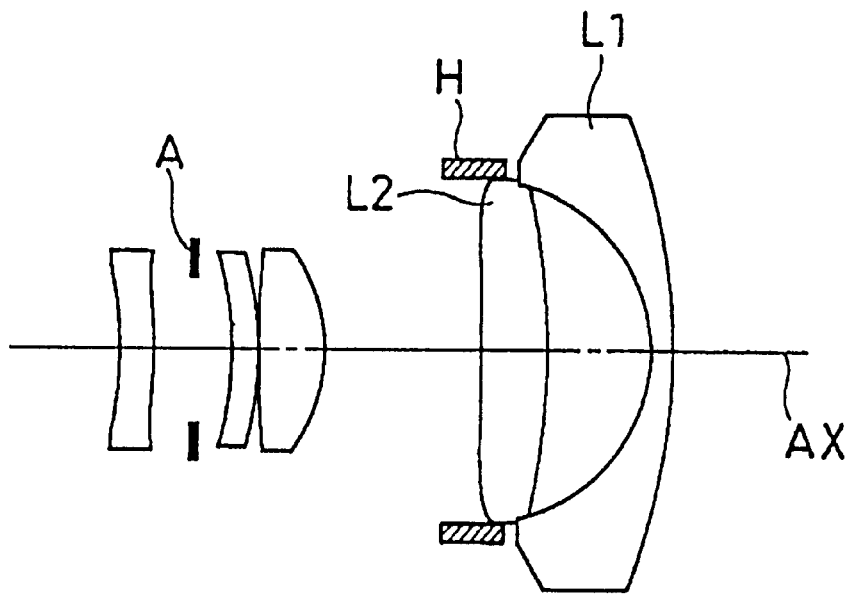
FIG. 5 is a lens structural diagram briefly showing a zoom lens of a third embodiment.
Figure 5:
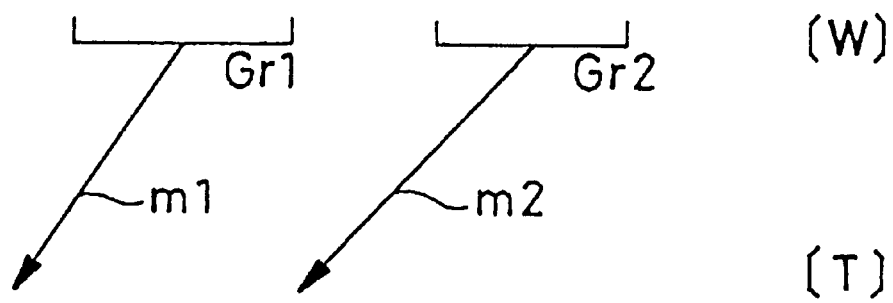
Figure 7:
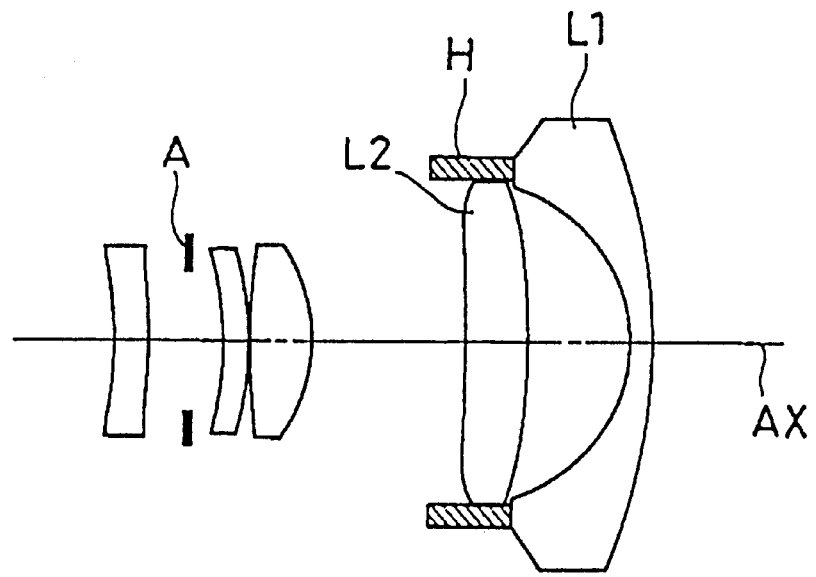
FIG. 7 is a lens structural diagram briefly showing a zoom lens of a fourth embodiment.
Figure 7:
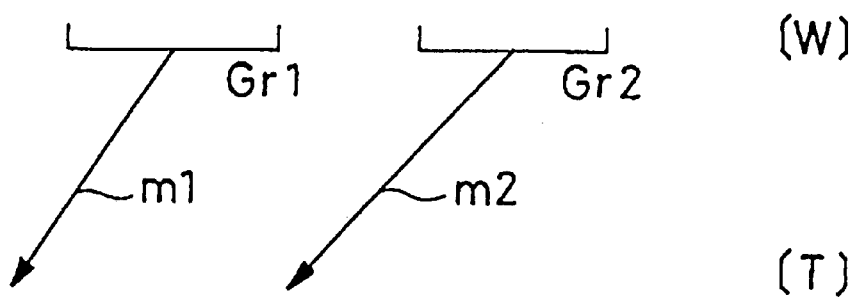

Application to a Second Lens Unit (negative optical power) in a Zoom Lens for a Lens Shutter Camera FIGS. 5 and 7 respectively show the lens construction of a zoom lens of the third and fourth embodiments and the lens arrangement thereof at the wide angle end (W), wherein the present invention is applied to a second lens unit Gr2. Both zoom lenses are for lens shutter cameras and each zoom lens comprises, sequentially from the object side, a first lens unit Gr1 having positive optical power, and a second lens unit Gr2 having negative optical power. Each lens unit Gr1 moves as indicated by arrows mi (i=1, 2) when zooming from the wide angle side (W) to the telephoto side (T).

As can be understood from the lens construction diagrams, in a projection optical system for a lens shutter camera, there is scant difference in the outer diameters of the lens elements in the lens unit positioned from the diaphragm A to the object side, although there is a great difference in the outer diameters of the lens elements in the lens unit positioned from the diaphragm A to the image side. In the third and fourth embodiments, the lens block of the second lens unit Gr2 disposed on the image side from the diaphragm A is the subject of the application of the present invention.

The third and fourth embodiments, in a lens block of the second lens unit Gr2 forming part of a zoom lens (FIGS. 5 and 7), are lens holding structures for holding a first lens element (negative meniscus lens) L1 disposed at one end of the lens block, and a second lens element (positive meniscus lens) L2 disposed adjacent to the first lens element L1 so as to have a predetermined open space on an optical axis AX of the lens block relative to the first lens element L1, on a holding barrel H having an outer diameter that is smaller than the maximum outer diameter of the first lens element L1. The optical system can be made compactly and inexpensively, and the space around the periphery of the second lens element L2 of small outer diameter can be used by holding the first lens element L1 outside the holding barrel H without using the outer circumferential surface of the lens element L1 when holding the first lens element L1 of larger outer diameter.

Figure 6:
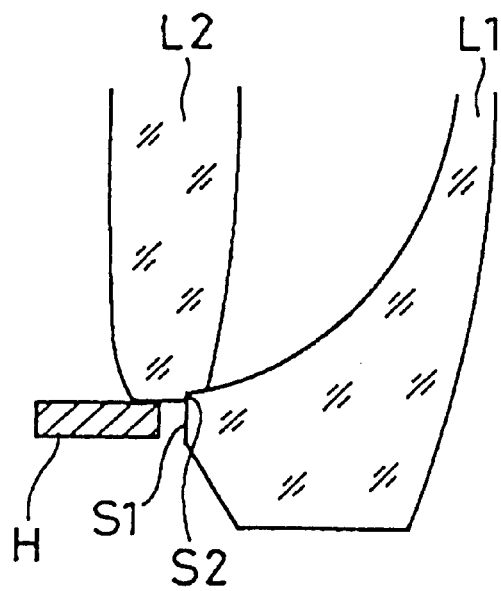
FIG. 6 is a section view showing an enlargement of the main part of the third embodiment.

Third Embodiment (FIGS. 5 and 6)

FIG. 6 shows an enlargement of the main cross section structure of the third embodiment. As can be understood from FIG. 6, characteristics of the third embodiment are the second lens element L2 fixed to the holding barrel H, and the first lens element L1 fixed directly to the second lens element L2 only. Working faces S1 and S2 perpendicular relative to the optical axis AX are respectively formed on the first and second lens elements L1 and L2 outside the effective diameters and the first lens element L1 and the second lens element L2 are directly attached and fixed by the working faces S1 and S2.

When assembling the lens block of the second lens unit Gr2, first, the second lens element L2 is engaged with the inner surface of the holding barrel H by its circumference and is fixed by adhesive to the holding barrel H. The second lens element L2 of the present embodiment is centered in advance so as to engage with the holding barrel H by its circumference. However, the second lens element L2 may be an uncentered lens. In this case, the second lens barrel L2 is centered after engaging with the holding barrel H, and then it is fixed using adhesive.

Then, the first lens element L1 and the second lens element L2 are directly attached and fixed by adhesive on the working faces S1 and S2. The first lens element L1 is centered before anchoring by adhesive is completed, so that alignment of the lens block is attained. The first lens element L1 may be an uncentered lens since it is centered while assembling. The working face S1 may be attached and fixed by adhesive to the endface of the holding barrel H as well as the working face S2. The working faces S1 and S2 may not be perpendicular relative to the optical axis AX and may have a predetermined inclination so that the first lens element L1 is approximately centered only by adhering the working faces S1 and S2 each other.

Figure 8:
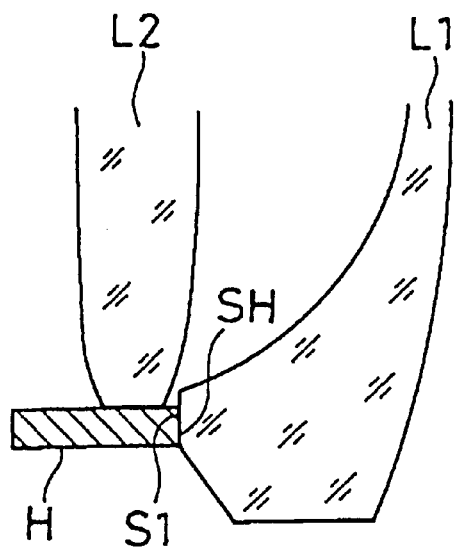
FIG. 8 is a section view showing an enlargement of the main part of the fourth embodiment.

Fourth Embodiment (FIGS. 7 and 8)

FIG. 8 shows an enlargement of the main cross section structure of the fourth embodiment. As can be understood from FIG. 8, characteristics of the fourth embodiment are the second lens element L2 fixed to the holding barrel H, and the first lens element L1 fixed directly to the holding barrel H on only a surface S1, which is perpendicular relative to the optical axis AX. Working faces S1 and SH perpendicular relative to the optical axis AX are respectively formed on the holding barrel H and the first lens element L1 outside the effective diameter, and the first lens element L1 is directly attached and fixed to the holding barrel H by the working faces S1 and SH.

When assembling the lens block of the second lens unit Gr2, first, the second lens element L2 is engaged with the inner surface of the holding barrel H by its circumference and is fixed by adhesive to the holding barrel H. The second lens element L2 of the present embodiment is centered in advance so as to engage with the holding barrel H by its circumference. However, the second lens element L2 may be an uncentered lens. In this case, the second lens barrel L2 is centered after engaging with the holding barrel H, and then it is fixed using adhesive.

Then, the first lens element L1 and the holding barrel H are directly attached and fixed by adhesive on the working faces S1 and SH. The first lens element L1 is centered before anchoring by adhesive is completed, so that alignment of the lens block is attained. The first lens element L1 may be an uncentered lens since it is centered while assembling. The working face S1 may be attached and fixed by adhesive on the second lens element L2 outside the effective diameter as well as the working face SH. The working faces S1 and SH may not be perpendicular relative to the optical axis AX and may have a predetermined inclination so that the first lens element L1 is approximately centered only by adhering the working faces S1 and SH each other.

A compact lens block having an inexpensive and simple construction can be realized by the aforesaid method of assembling the lens block and lens holding structure of the third and fourth embodiments. In this way, an optical system of a zoom lens and the like including this lens block, when used in a lens shutter camera, allows a compact and inexpensive lens shutter camera to be achieved.

Embodiment Having Characteristics on the Working Face

Figure 9:
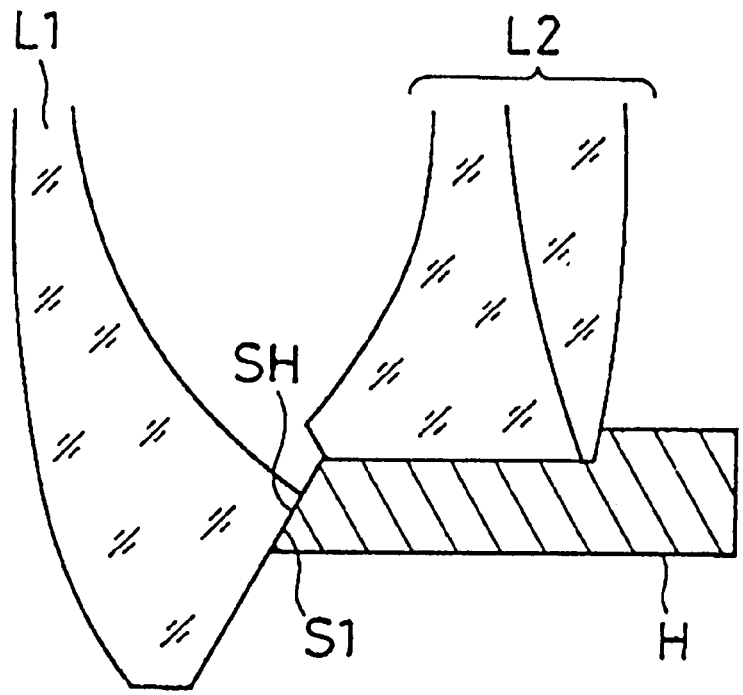
FIG. 9 is a section view showing an enlargement of the main part of a fifth embodiment.
Figure 10:
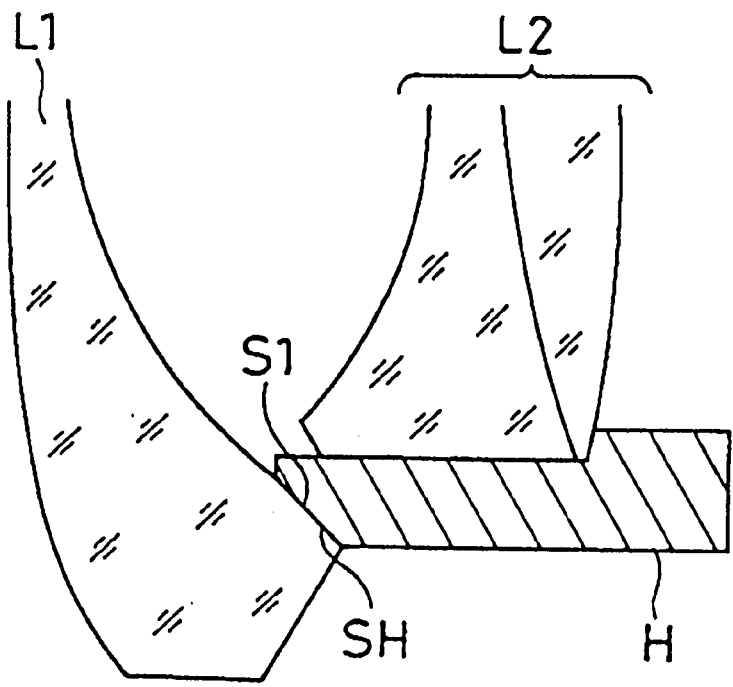
FIG. 10 is a section view showing an enlargement of the main part of a sixth embodiment.
Figure 11:
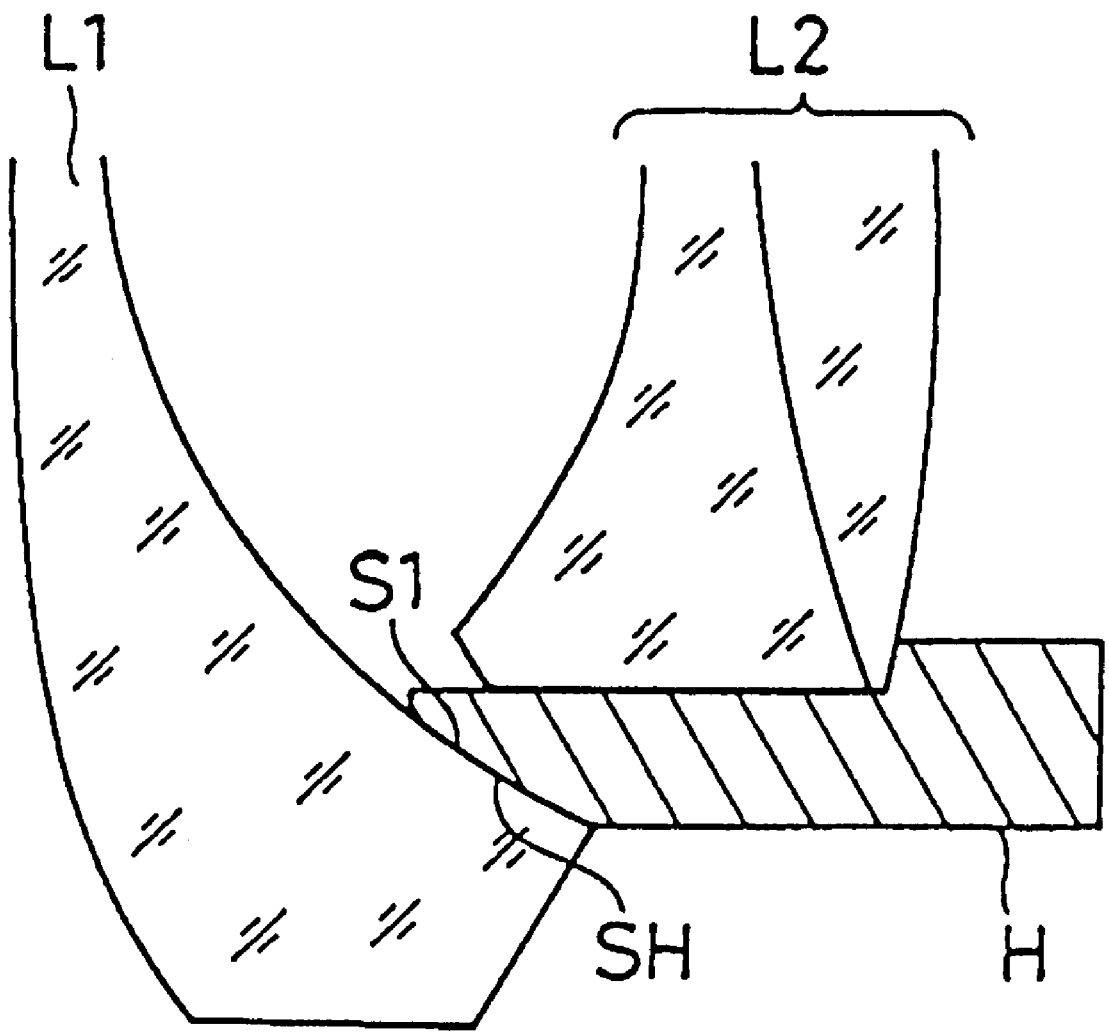
FIG. 11 is a section view showing an enlargement of the main part of a seventh embodiment.

FIGS. 9 through 11 respectively show enlargements of the main cross section structure of the fifth through seventh embodiments which are modifications of the second embodiment. The fifth through seventh embodiments provide characteristics on the working faces S1 and SH, but in other respects have constructions which are identical to the second embodiment. A compact lens block having an inexpensive and simple construction can be realized by the method of assembling the lens block and the lens holding structure similar to those of the first through fourth embodiments, and in this way, an optical system in a zoom lens and the like including this lens block, when used in a video camera, allows a compact and inexpensive video camera to be achieved.

The fifth through seventh embodiments, in a lens block of the second lens unit Gr2 forming part of a zoom lens (FIG. 3), are lens holding structures for holding a first lens element (negative meniscus lens) L1 disposed at one end of the lens block, and a second lens element (cemented lens comprising a biconcave lens and a biconvex lens) L2 disposed adjacent to the first lens element L1 so as to have a predetermined open space on the optical axis AX relative to the first lens element L1, on a holding barrel H having an outer diameter that is smaller than the maximum outer diameter of the first lens element L1. The optical system can be made compactly and inexpensively, and the space around the periphery of the second lens element L2 of small outer diameter can be used by holding the first lens element L1 outside the holding barrel H without using the outer circumferential surface of the lens element L1 when holding the first lens element L1 of larger outer diameter.

Characteristics of both the fifth and sixth embodiments (FIGS. 9 and 10) are the second lens element L2 fixed to the holding barrel H, and the first lens element L1 fixed directly to the holding barrel H by working face S1 placed at an angle relative to the optical axis AX. Working faces S1 and SH placed at an angle relative to the optical axis AX are respectively formed on the holding barrel H and the first lens element L1 outside the effective diameter, and the first lens element L1 is directly attached and fixed to the holding barrel H by the working faces S1 and SH. It is noted that, in this specification, a face "placed at an angle relative to the optical axis AX" means a face having an angle which is neither flat (0°) nor perpendicular (90°) relative to the optical axis AX.

Characteristics of the seventh embodiment (FIG. 11) are the second lens element L2 fixed to the holding barrel H, and the first lens element L1 fixed directly to the holding barrel H by a working face S1 outside the effective diameter of the first lens element L1, which forms an extension of effective lens surface. Working faces SH and S1 forming the extension of the effective surface of the first lens element L1 are respectively formed on the holding barrel H and on the first lens element L1 outside the effective diameter, and the first lens element L1 is directly attached and fixed to the holding barrel H by the working surfaces S1 and SH.

In the fifth through seventh embodiments, when assembling the lens block of the second lens unit Gr2, first, the second lens element L2 is engaged with the inner surface of the holding barrel H by its circumference and is fixed by adhesive to the holding barrel H. The second lens element L2 of the present embodiment is centered in advance so as to engage with the holding barrel H by its circumference. However, the second lens element L2 may be an uncentered lens. In this case, the second lens barrel L2 is centered after engaging with the holding barrel H, and then it is fixed using adhesive.

Then, the first lens element L1 and the holding barrel H are directly attached and fixed by adhesive on the working faces S1 and SH, so that approximate centering of the first lens element L1 is accomplished via the inclination of the surface of the working faces S1 and SH. The working face S1 may be attached and fixed by adhesive on the second lens element L2 outside the effective diameter as well as the working face SH.

A compact lens block having an inexpensive and simple construction can be realized by the aforesaid lens holding structure and the method of assembling the lens block of each of the previously described embodiments. In this way, an optical system including this lens block, when used in a digital camera, video camera or lens shutter camera, allows a compact and inexpensive video camera to be achieved.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A lens holding structure in a lens block forming all or part of an optical system, the lens holding structure comprising:
   a first lens element;
   a second lens element arranged adjacent to the first lens element with a predetermined open space on an optical axis of the lens block relative to the first lens element; and
   a holding barrel having an outer diameter smaller than the maximum outer diameter of the first lens element;
   wherein the second lens element is fixed to the holding barrel, and the first lens element is directly attached and fixed only to the second lens element.

2. A lens holding structure as claimed in claim 1, wherein said first lens element is fixed to the second lens element by adhesive.

3. A lens holding structure as claimed in claim 1, wherein said first lens element includes a first face perpendicular to the optical axis and outside effective diameter of the first lens element;
   said second lens element includes a second face perpendicular to the optical axis and outside effective diameter of the second lens element; and
   said first lens element is fixed to the second lens element by adhering the first face to the second face using adhesive.

4. A lens holding structure in a lens block forming all or part of an optical system, the lens holding structure comprising:
   a first lens element; and
   a holding barrel having an outer diameter smaller than the maximum outer diameter of the first lens element;
   wherein the first lens element is directly attached and fixed to the holding barrel only by a first face thereof perpendicular to an optical axis of the lens block.

5. A lens holding structure as claimed in claim 4, wherein said first lens element is fixed to the holding barrel by adhesive.

6. A lens holding structure as claimed in claim 4, wherein said holding barrel includes a second face perpendicular to the optical axis, and said first lens element is fixed to the holding barrel by adhering the first face to the second face using adhesive.

7. A lens holding structure as claimed in claim 4, further comprising a second lens element arranged adjacent to the first lens element with a predetermined open space on the optical axis relative to the first lens element.

8. A lens holding structure in a lens block forming all or part of an optical system, the lens holding structure comprising:
   a first lens element; and
   a holding barrel having an outer diameter smaller than the maximum outer diameter of the first lens element;
   wherein the first lens element is directly attached and fixed to the holding barrel only by a first face thereof placed at an angle with respect to an optical axis of the lens block.

9. A lens holding structure as claimed in claim 8, wherein said first lens element is fixed to the holding barrel using adhesive.

10. A lens holding structure as claimed in claim 8, wherein said holding barrel includes a second face corresponding to the first face of the first lens element, and said first lens element is fixed to the holding barrel by adhering the first face to the second face using adhesive.

11. A lens holding structure as claimed in claim 8, further comprising a second lens element arranged adjacent to the first lens element with a predetermined open space on the optical axis relative to the first lens element.

12. A lens holding structure in a lens block forming all or part of an optical system, the lens holding structure comprising:
   a first lens element; and
   a holding barrel having an outer diameter smaller than the maximum outer diameter of the first lens element;
   wherein the first lens element directly attached and fixed to the holding barrel only by a first face outside effective diameter thereof, the first face forming an extension of effective surface of the first lens element.

13. A lens holding structure as claimed in claim 12, wherein said first lens element is fixed to the holding barrel using adhesive.

14. A lens holding structure as claimed in claim 12, wherein said holding barrel includes a second face corresponding to the first face of the first lens element, and said first lens element is fixed to the holding barrel by adhering the first face to the second face using adhesive.

15. A lens holding structure as claimed in claim 12, further comprising a second lens element arranged adjacent to the first lens element with a predetermined open space on an optical axis of the lens block relative to the first lens element.

16. A method for assembling a lens block which forms all or part of an optical system and includes a first lens element, a second lens element adjacent to the first lens element and a holding barrel having an outer diameter smaller than the maximum outer diameter of the first lens element, the method comprising the steps of:
   fixing the second lens element to the holding barrel;
   adhering a face of the first lens element to the second lens element with a predetermined open space on an optical axis of the lens block between the first lens element and the second lens element or to the holding barrel using adhesive; and
   centering the first lens element before adhesion in the step of adhering is completely finished, so as to achieve alignment of the lens block.

17. A method for assembling a lens block as claimed in claim 16, wherein, at the step of adhering, said first lens element is adhered only to the second lens element.

18. A method for assembling a lens block as claimed in claim 16, wherein, at the step of adhering, said first lens element is adhered to the holding barrel using only a face thereof perpendicular with respect to an optical axis of the lens block.

19. A method for assembling a lens block as claimed in claim 16, wherein, at the step of adhering, said first lens element is adhered to the holding barrel by a face thereof placed at an angle with respect to an optical axis of the lens block.

20. A method for assembling a lens block as claimed in claim 16, wherein, at the step of adhering, said first lens element is adhered to the holding barrel by a face outside effective diameter thereof, the face forming an extension of effective surface of the first lens element.

* * * * *